(12) United States Patent
Kroizer et al.

(10) Patent No.: US 12,712,483 B2
(45) Date of Patent: Aug. 18, 2026

(54) DRIVE-SYSTEM PROTECTION ARRANGEMENTS FOR PHOTOVOLTAIC TRACKERS

(71) Applicant: NEXTPOWER LLC, Fremont, CA (US)

(72) Inventors: Israel Kroizer, Jerusalem (IL); Gil Kroyzer, Jerusalem (IL); Eyal Rosenwein, Mazkeret Batya (IL); Efrat Zocher Arica, Jeruslaem (IL); Morag Am-Shallem, Jerusalem (IL); Yehoshua Grantz, Mevaseret Zion (IL); Boaz Grosman, Mevaseret Zion (IL)

(73) Assignee: NEXTPOWER LLC, Fremont, CA (US)

( * ) Notice: Subject to any disclaimer, the term of this patent is extended or adjusted under 35 U.S.C. 154(b) by 0 days.

(21) Appl. No.: 18/637,503

(22) Filed: Apr. 17, 2024

(65) Prior Publication Data

US 2025/0330114 A1 Oct. 23, 2025

(51) Int. Cl.
*H02S 20/32* (2014.01)

(52) U.S. Cl.
CPC .................................... *H02S 20/32* (2014.12)

(58) Field of Classification Search
CPC ..................... H02S 20/00–32; H02S 30/00–20
USPC .................................................. 136/243–265
See application file for complete search history.

(56) References Cited

FOREIGN PATENT DOCUMENTS

| | | | | |
|---|---|---|---|---|
| CN | 113110610 A | * 7/2021 | ............... | G05D 3/12 |
| CN | 117410672 A | * 1/2024 | ............... | H01Q 1/12 |
| KR | 20090126157 A | * 12/2009 | ............. | H02S 20/32 |
| KR | 101983631 B1 | * 9/2019 | ............. | H01B 17/38 |

OTHER PUBLICATIONS

KR-20090126157-A English (Year: 2009).*
KR-101983631-B1 English (Year: 2019).*
CN-117410672-A English (Year: 2024).*
CN-113110610-A English (Year: 2021).*

* cited by examiner

*Primary Examiner* — Bach T Dinh

(74) *Attorney, Agent, or Firm* — Fredrikson & Byron, P.A.

(57) ABSTRACT

In a solar energy system, a photovoltaic (PV) assembly includes an array of PV panels joined to and pivotable together with a frame subassembly. A drive system includes a motor assembly including an electric motor and a drive-system controller, and a pivot-wheel assembly for transferring torque from the electric motor to the frame subassembly. The pivot-wheel assembly includes a drive chain joined to a hoop portion at two opposing coupling points defining limits of the mechanical pivot range of the PV assembly. A drive-system protection arrangement includes a pair of spaced-apart tab portions comprising respective sensor targets, joined to the hoop portion and circumferentially displaced from the two opposing coupling points, and a sensor in electronic communication with the drive-system controller and operative to send a signal thereto indicating detection of a proximate presence of one of the sensor targets.

11 Claims, 4 Drawing Sheets

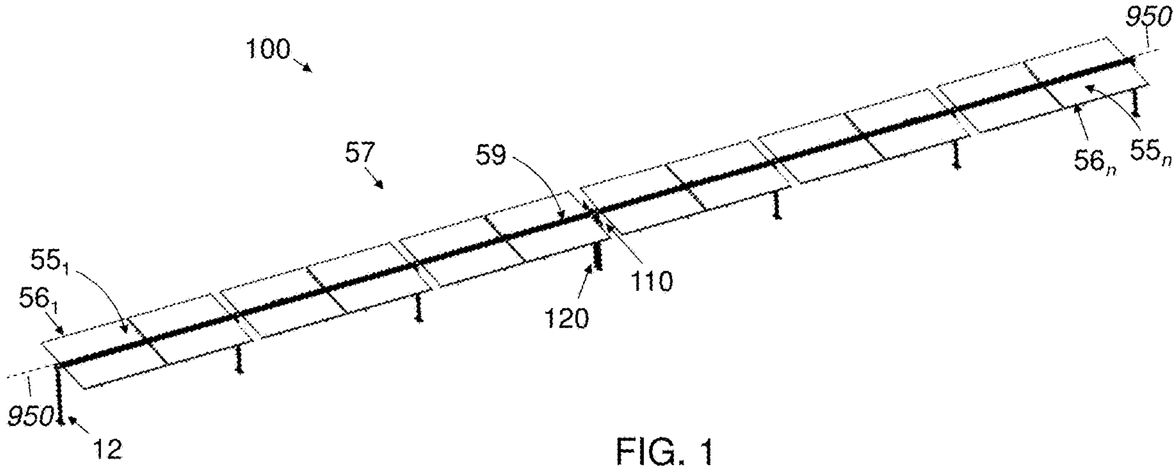
FIG. 1
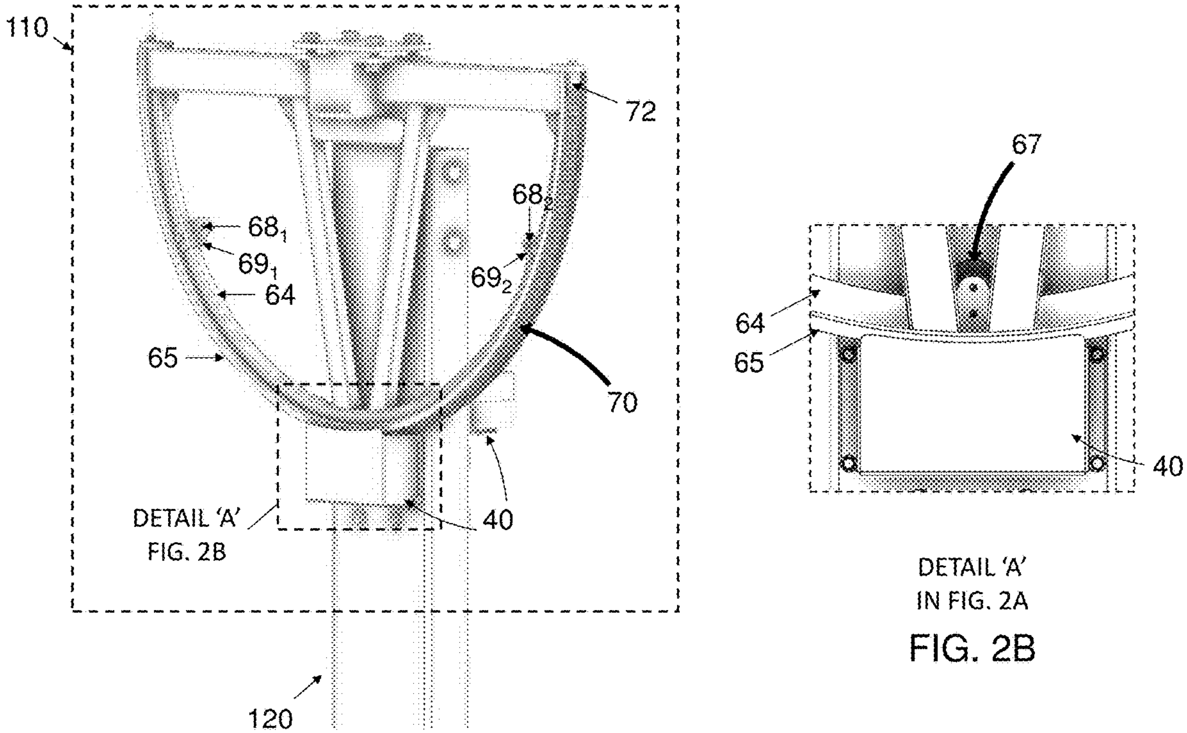
FIG. 2B
FIG. 2A

SIDE VIEW

FRONT VIEW

Step S01 rotating the pivot wheel 65 towards a limit 72 of the defined mechanical pivot range *900*

Step S02 receive the signal from the magnetic sensor 67 indicating detection of the presence of one of the magnets 68

Step S03 stop or slow the rotating of the pivot wheel 65 before reaching the limit 72 of the defined mechanical pivot range *900*

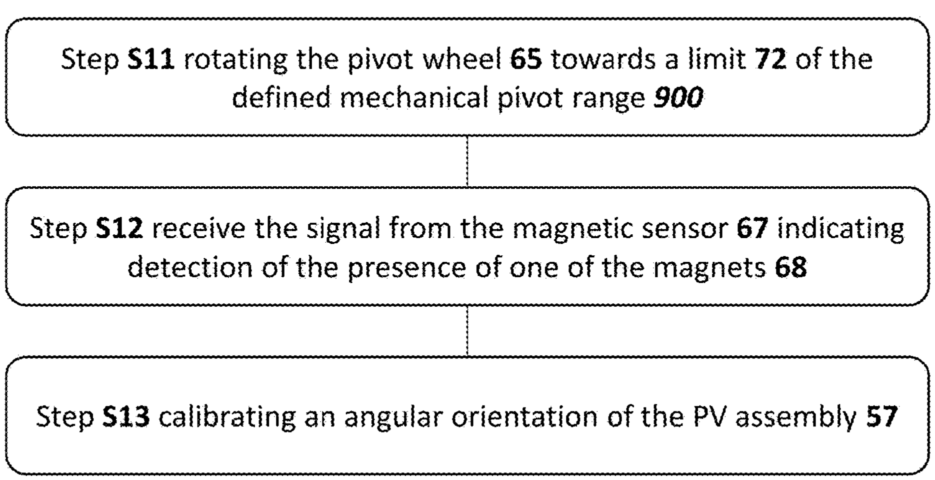
FIG. 5
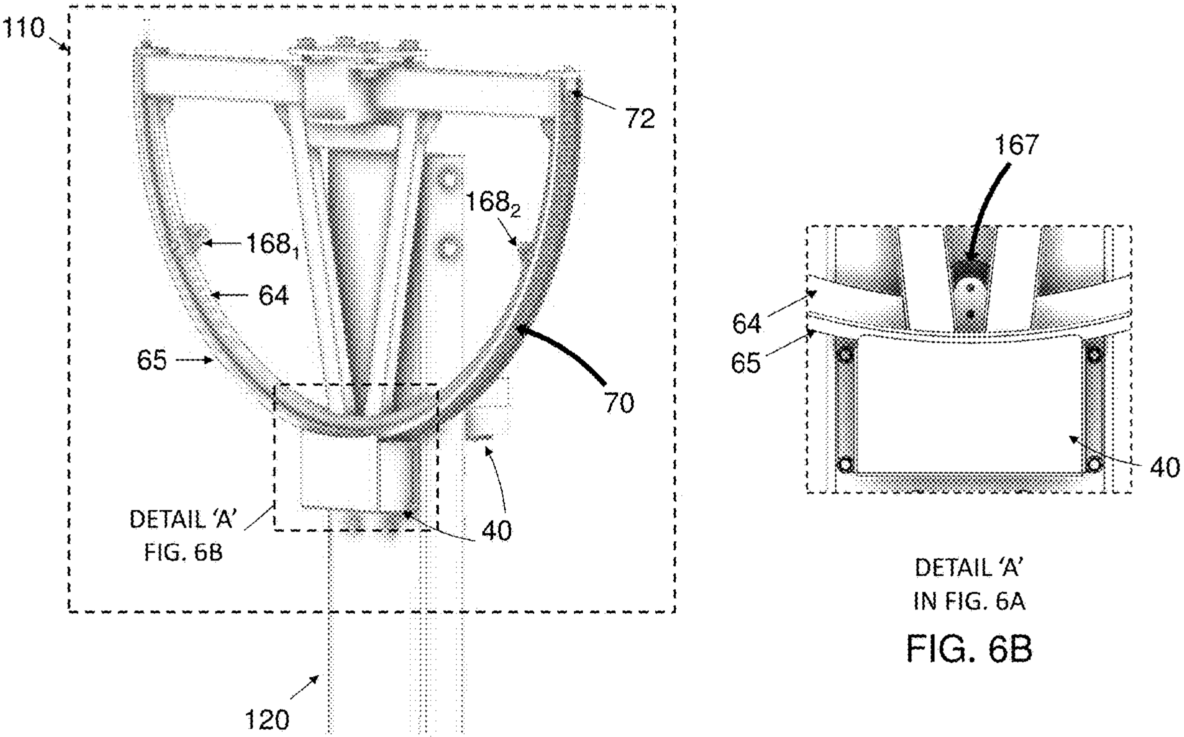
FIG. 6A
FIG. 6B

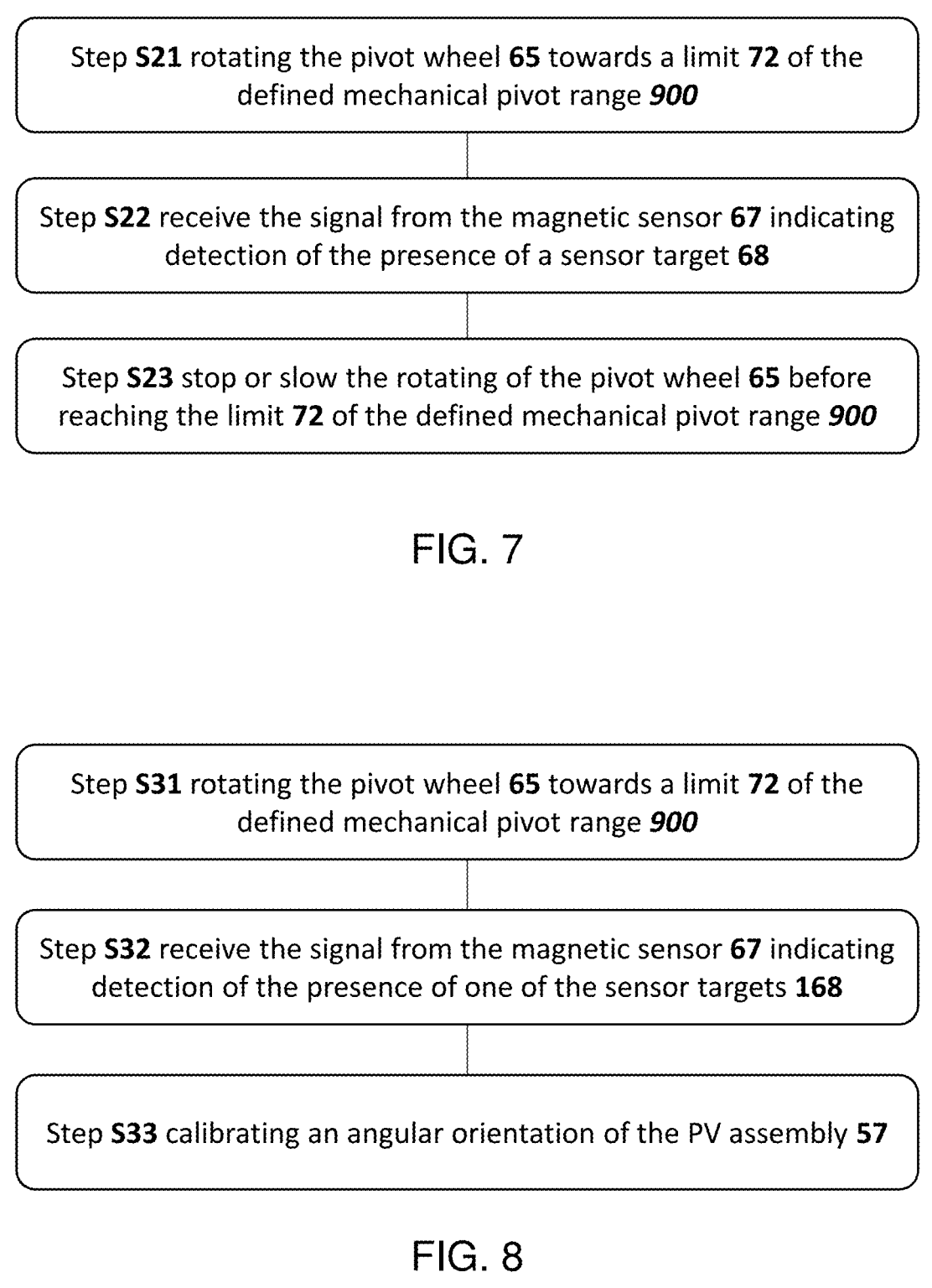

Step S21 rotating the pivot wheel 65 towards a limit 72 of the defined mechanical pivot range *900*

Step S22 receive the signal from the magnetic sensor 67 indicating detection of the presence of a sensor target 68

Step S23 stop or slow the rotating of the pivot wheel 65 before reaching the limit 72 of the defined mechanical pivot range *900*

FIG. 7

Step S31 rotating the pivot wheel 65 towards a limit 72 of the defined mechanical pivot range *900*

Step S32 receive the signal from the magnetic sensor 67 indicating detection of the presence of one of the sensor targets 168

Step S33 calibrating an angular orientation of the PV assembly 57

FIG. 8

DRIVE-SYSTEM PROTECTION ARRANGEMENTS FOR PHOTOVOLTAIC TRACKERS

FIELD OF THE INVENTION

The present invention relates to solar energy systems based on photovoltaic trackers, and in particular to the use of sensors for drive-system protection.

BACKGROUND

Achieving a diversified low-carbon emissions energy economy has been limited by economic and technological limitations. Solar energy systems comprising photovoltaic (PV) arrays are commonly deployed to capture energy from both direct and diffuse (including reflected) solar irradiance. Tracking PV systems are deployed in which PV arrays are pivoted to reduce the cosine losses of the direct irradiance component, so-called because the energy absorbed is a function of the cosine of the angle.

Commercially available tracking PV systems, known as 'PV trackers', employ heavy-duty drive systems comprising electric motors and typically installed on robust support pylons that bear the load of PV assemblies and withstand the forces associated with pivoting the PV assemblies. The drive systems are equally robust, often overbuilt, including with expensive mechanical 'overtravel' protection and/or instrumentations such as inclinometers. For smaller and lighter PV systems, there is a need for a more efficient, lightweight and inexpensive solution that protects drive systems against overtravel, i.e., from reaching or trying to exceed mechanical pivot limits.

SUMMARY

According to embodiments disclosed herein, a solar energy system comprises: (a) a photovoltaic (PV) assembly comprising a frame subassembly and an array of PV panels joined thereto and pivotable therewith about a longitudinal axis of the PV assembly; (b) a drive system comprising a motor assembly including an electric motor and a drive-system controller, and a pivot-wheel assembly arranged to transfer a torque from the electric motor to the frame subassembly, the pivot-wheel assembly comprising a drive chain joined to a hoop portion at two opposing coupling points defining respective limits of a mechanical pivot range of the PV assembly; and (c) a drive-system protection arrangement comprising: (i) a pair of spaced-apart magnets joined to the hoop portion and circumferentially displaced from the two opposing coupling points, and (ii) a magnetic sensor in electronic communication with the drive-system controller and operative to send a signal thereto indicating detection of a proximate presence of one of the spaced-apart magnets.

In some embodiments, it can be that the drive-system protection arrangement is configured so that the signal is sent before the pivot wheel is rotated to a limit of the mechanical pivot range.

In some embodiments, the spaced-apart magnets can be joined to a gusset member of the hoop portion. In some embodiments, the magnetic sensor can be a Hall-effect sensor.

In some embodiments, the drive-system controller can be programmed to receive the signal and perform at least one of the following in response thereto: (i) stopping the rotating of the pivot wheel before reaching the limit of the defined mechanical pivot range, and/or (ii) slowing the rotating of the pivot wheel before reaching the limit of the defined mechanical pivot range.

In some embodiments, a method for operating the solar energy system of any one of the foregoing embodiments can comprise: (a) rotating the pivot wheel towards a limit of the defined mechanical pivot range; (b) receiving, by the drive-system controller, the signal from the magnetic sensor indicating detection of a proximate presence of one of the spaced-apart magnets; and/or (c) in response to receiving the signal, performing one of the following: (i) stopping the rotating of the pivot wheel before reaching the limit of the defined mechanical pivot range, and (ii) slowing the rotating of the pivot wheel before reaching the limit of the defined mechanical pivot range. In some embodiments of the method, the stopping and/or slowing can be performed following a predetermined time interval after the receiving of the signal, the predetermined time being based upon at least one of: a current rotational or angular speed of the hoop portion, and a circumferential distance between the one of the spaced-apart magnets and the limit of the defined mechanical pivot range. In some embodiments of the method, the electric motor can comprise a stepper motor, and the rotating can be stopped and/or slowed after a predetermined number of motor steps following the receiving of the signal, the predetermined number being based upon, e.g., at least one of: a rotational or angular speed of the hoop portion and a circumferential distance between the one of the spaced-apart magnets and the limit of the defined mechanical pivot range.

In some embodiments, a method for operating the solar energy system of any of the foregoing embodiments can comprise: (a) rotating the pivot wheel towards a limit of the defined mechanical pivot range; (b) receiving, by the drive-system controller, the signal from the magnetic sensor indicating detection of a proximate presence of one of the spaced-apart magnets; and/or (c) responsively to receiving the signal, calibrating an angular orientation of the PV assembly. In some embodiments of the method, the calibrating can be based on, e.g., at least one of a detected strength of the proximate presence and a detected direction of the proximate presence.

According to embodiments disclosed herein, a solar energy system comprises: (a) a photovoltaic (PV) assembly comprising a frame subassembly and an array of PV panels joined thereto and pivotable therewith about a longitudinal axis of the PV assembly; (b) a drive system comprising a motor assembly including an electric motor and a drive-system controller, and a pivot-wheel assembly arranged to transfer a torque from the electric motor to the frame subassembly, the pivot-wheel assembly comprising a drive chain joined to a hoop portion at two opposing coupling points defining respective limits of a mechanical pivot range of the PV assembly; and (c) a drive-system protection arrangement comprising: (i) a pair of spaced-apart tab portions comprising respective sensor targets, joined to the hoop portion and circumferentially displaced from the two opposing coupling points, and (ii) a sensor in electronic communication with the drive-system controller and operative to send a signal thereto indicating detection of a proximate presence of one of the sensor targets.

In some embodiments, the respective sensor targets can comprise magnets, and the sensor can comprise a magnetic sensor such as, for example, a Hall-effect sensor. In some embodiments, the respective sensor targets can comprise a metal or metal alloy, and the sensor can comprise an induction sensor.

In some embodiments, the sensor can comprise an ultrasonic sensor. In some embodiments, the sensor can comprise an optical sensor. In some such embodiments, the respective sensor targets comprise markings or reflectors.

In some embodiments, it can be that the drive-system protection arrangement is configured so that the signal is sent before the pivot wheel is rotated to a limit of the mechanical pivot range.

In some embodiments, the spaced-apart sensor targets can be joined to a gusset member of the hoop portion.

In some embodiments, the drive-system controller can be programmed to receive the signal and perform at least one of the following in response thereto: (i) stopping the rotating of the pivot wheel before reaching the limit of the defined mechanical pivot range, and/or slowing the rotating of the pivot wheel before reaching the limit of the defined mechanical pivot range.

In some embodiments, a method of operating the solar energy system of any one of the foregoing embodiments involving spaced-apart sensor targets can comprise: (a) rotating the pivot wheel towards a limit of the defined mechanical pivot range; (b) receiving, by the drive-system controller, the signal from the sensor indicating detection of a proximate presence of one of the spaced-apart sensor targets; and (c) in response to receiving the signal, performing one of the following: (i) stopping the rotating of the pivot wheel before reaching the limit of the defined mechanical pivot range, and (ii) slowing the rotating of the pivot wheel before reaching the limit of the defined mechanical pivot range. In some embodiments of the method, the stopping and/or slowing can be performed following a predetermined time interval after the receiving of the signal, the predetermined time being based upon, e.g., at least one of: a current rotational or angular speed of the hoop portion, and a circumferential distance between the one of the spaced-apart sensor targets and the limit of the defined mechanical pivot range. In some embodiments of the method, the electric motor can comprise a stepper motor, and/or the rotating can be stopped or slowed after a predetermined number of motor steps following the receiving of the signal, the predetermined number being based upon at least one of: a rotational or angular speed of the hoop portion and a circumferential distance between the one of the spaced-apart sensor targets and the limit of the defined mechanical pivot range.

In some embodiments, a method of operating the solar energy system of any one of the foregoing embodiments involving spaced-apart sensor targets can comprise: (a) rotating the pivot wheel towards a limit of the defined mechanical pivot range; (b) receiving, by the drive-system controller, the signal from the sensor indicating detection of a proximate presence of one of the spaced-apart sensor targets; and (c) responsively to receiving the signal, calibrating an angular orientation of the PV assembly. In some embodiments of the method, the calibrating can be based on, e.g., at least one of a detected intensity of the proximate presence and a detected direction of the proximate presence.

BRIEF DESCRIPTION OF THE DRAWINGS

The invention will now be described further, by way of example, with reference to the accompanying drawings, in which the dimensions of components and features shown in the figures are chosen for convenience and clarity of presentation and not necessarily to scale. In the drawings:

FIG. 1 is a schematic perspective-view illustration of a photovoltaic (PV) energy system according to embodiments of the present invention.

FIG. 2A is a schematic perspective-view illustration of a drive system mounted to a support pylon, according to embodiments of the present invention.

FIG. 2B shows a detail of FIG. 2A including an exemplary magnetic sensor, according to embodiments of the present invention.

FIG. 3A is a schematic side elevation-view illustration of a drive system installed on a support pylon, according to embodiments of the present invention.

FIG. 3B is a front view of the drive system of FIG. 3A showing a pivot range and exemplary magnets, according to embodiments of the present invention.

FIGS. 4 and 5 show flowcharts of respective methods for operating a solar energy system according to embodiments of the present invention.

FIG. 6A is a schematic perspective-view illustration of a drive system mounted to a support pylon, according to embodiments of the present invention.

FIG. 6B shows a detail of FIG. 6A including an exemplary sensor, according to embodiments of the present invention.

FIGS. 7 and 8 show flowcharts of respective methods for operating a solar energy system according to embodiments of the present invention.

DETAILED DESCRIPTION OF THE ILLUSTRATED EMBODIMENTS

Figures 3A, 3B, 4:
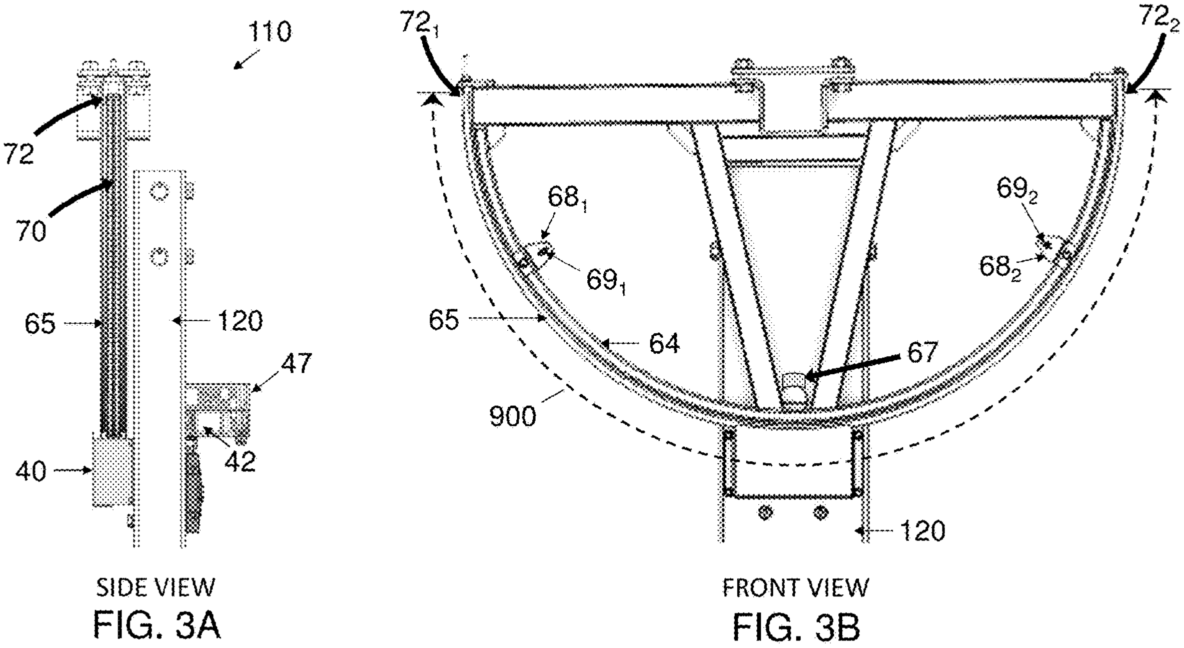

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawings, like-referenced characters are generally used to designate like elements.

Note: Throughout this disclosure, subscripted reference numbers (e.g., 101 or 10A) may be used to designate multiple separate appearances of elements of a single species, whether in a drawing or not; for example: 101 is a single appearance (out of a plurality of appearances) of element 10. The same elements can alternatively be referred to without subscript (e.g., 10 and not 101) when not referring to a specific one of the multiple separate appearances, i.e., to the species in general.

For convenience, in the context of the description herein, various terms are presented here. To the extent that definitions are provided, explicitly or implicitly, here or elsewhere in this application, such definitions are understood to be consistent with the usage of the defined terms by those of skill in the pertinent art(s). Furthermore, such definitions are to be construed in the broadest possible sense consistent with such usage.

A 'solar energy system' as used herein means a system for generating electricity using an array of photovoltaic (PV) panels or modules. The system can include an inverter for converting the direct-current (DC) electricity generated by the PV modules to alternating current (AC) electricity, e.g., for delivery to an electricity grid. Embodiments disclosed herein relate to apparatuses and systems related to operating a solar energy system incorporating a solar tracker. A solar tracker, or simply 'tracker' or 'PV tracker', is an arrangement that changes the attitude of its PV panels so as to capture, i.e., convert, a higher proportion of the direct irradiance falling on the panels over the course of any given period of time by reducing the angle between direct solar radiation and a vector normal to the PV panels. A single-axis tracker is one that rotates its PV panels around a single axis, usually from east to west over the course of a day around a north-south axis. Some single-axis trackers are arranged to rotate about an east west axis but otherwise work on similar principles.

Solar energy systems can be configured to prevent 'overtravel' of the PV panels beyond a designed limit of pivot travel. For example, it can be desirable to protect components of a drive system of the PV tracker from any attempt to pivot beyond a limit imposed by mechanical design. Smaller and lighter systems can be less expensive to build and operate, and by design may lack some of the instrumentation built into larger, heavier and more expensive systems for preventing overtravel and for protecting the drive system of the assembly of PV panels. In such smaller and lighter PV systems, it can be that the controller of the drive system does not have access to the actual attitude of the PV assembly with a high degree of accuracy, especially if time has passed since the last calibration of the PV system. As a result, the controller does not 'know', with a high degree of confidence, exactly when the PV assembly has reached, or is about to reach, its mechanical pivot limit. Operating the electric motor to continue pivoting a PV assembly beyond the mechanical limits can cause damage to various parts of the drive system. Therefore, without a drive-system protection arrangement, it can be deemed worthwhile to reduce the effect pivot range of the PV tracker, which results in loss of revenues from sales of electricity generated.

According to embodiments, a drive-system protection arrangement is provided for the prevention of such overtravel and avoidance of damage, with a minimum of instrumentation that can easily and inexpensively be deployed in a solar energy system, including as a retrofit.

Referring now to the figures, and in particular to FIG. 1, a solar energy system 100 according to embodiments includes a PV assembly 57 comprising an array of n PV panels $\mathbf{55}_1$ through $\mathbf{55}_n$ respectively joined to an array of n frames $\mathbf{56}_1$ through $\mathbf{56}_n$. A frame assembly includes the frames 56 and a central elongated member 59 to which the frames 56 are joined. The central elongated member 59 serves to transfer a torque, e.g., from an electric motor, to rotate the PV assembly 57, i.e., the frames 56 as a unit, together with the central elongated member 59 and the PV panels 55. The PV assembly 57 rotates about a central longitudinal axis indicated in FIG. 1 by line 950. The central elongated member 59 is pivotably supported by multiple ground supports 12 and by a central support pylon 120 at which the drive system 110 of the solar energy system 100 is installed. The drive system 110, in the non-limiting examples described and illustrated herein, transfers torque to the frame subassembly at a single location along the length of the central elongated member 59, and in such examples the drive system 110 is located at or adjacent to the midpoint of the central elongated member 59.

FIG. 2A shows a general view of a drive system 110 mounted to the support pylon 120. The drive system 110 includes a motor assembly 40 mounted to the wall 114 and a pivot-wheel assembly comprising a drive chain 70 joined to a hoop portion 65 at two opposing coupling points 72.

In embodiments, a drive-system protection arrangement comprises a pair of spaced-apart magnets 68 joined to the hoop portion 65 and circumferentially displaced from the two opposing coupling points 72. The drive-system protection arrangement also comprises a magnetic sensor 67 in electronic communication with a drive-system controller. Upon detection of a proximate presence of one of the spaced-apart magnets during regular pivoting operation of the PV assembly 57, the magnetic sensor is operative to send a signal to the controller, e.g., alerting the controller to the proximal presence of a spaced-apart magnet 68. Detection of the proximity of one of the spaced-apart magnets to the magnetic sensor indicates that the pivot-wheel assembly, i.e., the hoop portion 65, is approaching a design limit of rotation. According to embodiments, the drive controller can be programmed to stop or slow the pivoting of the pivot-wheel assembly following the sending of the signal by the magnetic sensor before the pivot-wheel assembly is rotated to a limit of the mechanical pivot range. The term 'programmed' as used herein and in the claims appended hereto can mean, for example, that the drive controller comprises a non-transient computer-readable medium having stored thereon relevant program instructions, and one or more processors configured to execute said program instructions. The skilled artisan will understand that many motors used in drive systems for PV trackers are stepper motors, and that 'slowing' the pivoting means increasing the time between mechanical steps of the motor; the actual rotational speed of the pivot wheel during each individual motor step does necessarily change. Additionally or alternatively, the duration of an electrical pulse of a step can be shortened. In an example, the difference between slowing and stopping is that 'stopping' means the pivot-wheel assembly once stopped will not continue pivoting in the same direction, e.g., before reversing pivot direction or pivoting to a 'safe' or 'stow' position, while slowing means that once slowed the pivot-wheel assembly continues in the same direction, but at a lower average speed. In some embodiments, a time delay can be implemented between the sending of the signal by the magnetic sensor and the stopping or slowing of the pivot-wheel assembly. For example, following the sending of the signal by the magnetic sensor, the controller can wait a given period of time, or a given number of motor steps, before implementing the stopping or slowing of the pivot-wheel assembly; the length of time or number of steps can be based upon, in non-limiting examples, a current rotational or angular speed of the hoop portion, which can be an average speed, a circumferential distance between the spaced-apart magnet 68 and the limit of the defined mechanical pivot range, and a predetermined length of time or number of motor stops in the controllers' program instructions.

In the non-limiting example of FIG. 2A, a pair of tabs $\mathbf{69}_1$, $\mathbf{69}_2$ is attached to a gusset member 64 of the hoop portion 65. Each of the tabs $\mathbf{69}_1$, $\mathbf{69}_2$ comprises or has joined thereto a respective one of the spaced-apart magnets $\mathbf{68}_1$, $\mathbf{68}_2$. In other examples (not shown), the tabs 69 are joined to the main body of the hoop portion 65 and not to the gusset member 64. In other examples (not shown), the spaced-apart magnets 68 are joined directly to the hoop member 65 or to the gusset member 64 without the tabs 69. Without limitation, the design decision as to where and how to install the magnets 68 can be based, at least in part, on the location of the magnetic sensor and/or the sensitivity of the magnetic sensor and/or on the strength of the magnets 68. Additionally or alternatively, the circumferential disposition of the magnets 68 (and tabs 69) on the arc of the hoop-member 65 or on the gusset member 64 can be based, at least in part, on the location of the magnetic sensor 67 and/or the sensitivity of the magnetic sensor 67 and/or on the strength of the magnets 68. The circumferential disposition of the spaced-apart magnets 68 in the drawings is meant to be illustrative and not to point out a particular location.

An example of a suitable location for a magnetic sensor 67 is shown schematically in the detail drawing of FIG. 2B. The exemplary location shown is at the center of the support pylon 120 and is approximately at the height of one of the magnets when it pivots past the pylon 120. In other examples (not shown), the magnetic sensor can be located elsewhere on the pylon, including higher or lower, or off to one side. In some embodiments, the magnetic sensor is a Hall-effect sensor.

We now refer to FIGS. 3A and 3B, respective side and front views of a drive system 110 for a solar energy system 100. FIG. 3A shows one of the two opposing coupling points 72 where the chain 70 is coupled to the hoop portion 65 of the pivot-wheel assembly. The coupling points 721, 722 define the limits of the mechanical pivot range, indicated in FIG. 3B by arrow 900, of the PV assembly 57, and can be at any point on the hoop portion 65 and not necessarily as shown in the non-limiting example of FIGS. 3A and 3B. The term 'define' can be meant to understand that the limit of the mechanical pivot range is at the coupling point 72 or at a predetermined circumferential distance from the coupling point 72.

A portion of the enclosure of the motor assembly 40 is made transparent in FIG. 3A to show an example of placement of the electric motor 42 and the drive-system controller 47. Thus, in this example, the drive-system controller 47 is close to the magnetic sensor 67, and the two can be connected by a physical wire (not shown), e.g., passing through the wall of the support pylon 120, or by a low-power wireless connection.

Referring now to FIG. 4, a method is disclosed for operating a solar energy system 100 as disclosed in any of the foregoing embodiments and illustrated in FIGS. 1, 2A, 2B, 3A and 3B. As illustrated by the flow chart in FIG. 4, the method comprises at least the 3 method steps S01, S02 and S03:

Step S01 includes rotating the pivot-wheel assembly towards a limit of the defined mechanical pivot range 900.

Step S02 includes receiving, by the drive-system controller 47, the signal from the magnetic sensor 67 indicating detection of a proximate presence of one of the spaced-apart magnets 68.

Step S03 includes stopping or slowing the rotating of the pivot-wheel assembly before reaching the limit of the defined mechanical pivot range 900. Step S03 is carried out in response to receiving the signal in Step S02. In some embodiments, the stopping and/or slowing is performed following a predetermined time interval after the receiving of the signal; the predetermined time is based upon at least one of: a current rotational or angular speed of the hoop portion 65, and a circumferential distance between the one of the spaced-apart magnets 68 and the limit of the defined mechanical pivot range 900. In some embodiments, the electric motor 42 comprises a stepper motor, and the rotating is stopped or slowed after a predetermined number of motor steps following the receiving of the signal; the predetermined number is based upon at least one of: a rotational or angular speed of the hoop portion 65 and a circumferential distance between the one of the spaced-apart magnets 68 and the limit of the defined mechanical pivot range 900.

In embodiments, a drive-protection arrangement as has been disclosed can be used, additionally or alternatively, for purposes of calibration of the drive system 110, and specifically for calibration of the angular orientation of the PV assembly 57, e.g., with respect to an expected angular orientation. Referring now to FIG. 5, a method is disclosed for operating a solar energy system 100 as disclosed in any of the foregoing embodiments and illustrated in FIGS. 1, 2A, 2B, 3A and 3B. As illustrated by the flow chart in FIG. 5, the method comprises at least the 3 method steps S11, S12 and S13. As can be understood from the following description, Steps S11 and S12 are the same as Steps S01 and S02, respectively.

Step S11 includes rotating the pivot-wheel assembly towards a limit of the defined mechanical pivot range 900.

Step S12 includes receiving, by the drive-system controller 47, the signal from the magnetic sensor 67 indicating detection of a proximate presence of one of the spaced-apart magnets 168.

Step S13 includes calibrating an angular orientation of the PV assembly 57. Step S13 is carried out in response to receiving the signal in Step S12. In some embodiments, the calibrating is based on at least one of a detected strength of the proximate presence of the spaced-out magnet 68 and a detected direction of the proximate presence of the spaced-out magnet 68.

We now refer to FIGS. 6A, 6B, 7 and 8, which illustrate embodiments in which a drive-protection arrangement includes a sensor and a pair of sensor targets.

Examples of suitable sensors include, and not exhaustively: magnetic sensors, induction sensors, ultrasonic sensors, and optical sensors. In a first example, as described hereinabove with reference to FIGS. 2A, 2B, 3A and 3B, the sensor comprises a magnetic sensor, and the pair of sensor targets includes respective magnets, e.g., mounted on tabs affixed to the hoop portion of the pivot-wheel assembly. In a second example, the sensor comprises an induction sensor, and the respective sensor targets are tabs affixed to the hoop portion of the pivot-wheel assembly, the tabs comprising a metal or metal alloy. In a third example, the sensor comprises an ultrasonic sensor, and the sensor targets include tabs affixed to the hoop portion. In a fourth example, the sensor comprises an optical sensor, and the respective sensor targets comprise markings or reflectors, which may or may not be mounted on tabs. In a fifth example, an imaging sensor is deployed, the signals sent to the drive controller include images captured by the imaging sensor, and the drive controller is programmed to process the received images.

FIG. 6A shows a general view of a drive system 110 mounted to the support pylon 120. The drive system 110 includes a motor assembly 40 mounted to the wall 114 and a pivot-wheel assembly comprising a drive chain 70 joined to a hoop portion 65 at two opposing coupling points 72. In embodiments, a drive-system protection arrangement comprises a pair of spaced-apart sensor targets 168 joined to the hoop portion 65 and circumferentially displaced from the two opposing coupling points 72. The drive-system protection arrangement also comprises a sensor 167 in electronic communication with a drive-system controller. The spaced-apart sensor targets 168 and the sensor 167 are according to any of the examples described above. Features and attributes of the drive system 110 described above with reference to FIGS. 3A and 3B are applicable to the drive system 110 of FIGS. 6A and 6B, mutatis mutandis.

Upon detection of a proximate presence of one of the spaced-apart sensor targets 168 during regular pivoting operation of the PV assembly 57, the sensor 167 is operative to send a signal to the controller 47, e.g., alerting the controller 47 to the proximal presence of a spaced-apart sensor target 168. Detection of the proximity of one of the spaced-apart sensor targets 168 to the sensor 167 indicates that the pivot-wheel assembly, i.e., the hoop portion 65, is approaching a design limit of rotation. According to embodiments, the drive controller can be programmed to stop or slow the pivoting of the pivot-wheel assembly following the sending of the signal by the sensor 167 before the pivot-wheel assembly is rotated to a limit of the mechanical pivot range 900. The skilled artisan will understand that many motors used in drive systems for PV trackers are stepper motors, and that 'slowing' the pivoting means increasing the time between mechanical steps of the motor; the actual rotational speed of the pivot-wheel assembly during each individual motor step does necessarily change. Additionally or alternatively, the duration of an electrical pulse of a step can be shortened. In an example, the difference between slowing and stopping is that 'stopping' means the pivot-wheel assembly will not continue pivoting in the same direction, e.g., before reversing pivot direction or pivoting to a 'safe' or 'stow' position, while slowing means that the pivot-wheel assembly continues in the same direction, but at a lower average speed. In some embodiments, a time delay can be implemented between the sending of the signal by the sensor 167 and the stopping or slowing of the pivot-wheel assembly. For example, following the sending of the signal by the sensor 167, the controller can wait a given period of time, or a given number of motor steps, before implementing the stopping or slowing of the pivot-wheel assembly; the length of time or number of steps can be based upon, in non-limiting examples, a current rotational or angular speed of the hoop portion, which can be an average speed, a circumferential distance between the spaced-apart sensor targets 168 and the limit of the defined mechanical pivot range, and a predetermined length of time or number of motor stops in the controllers' program instructions.

In the non-limiting example of FIG. 6A, a pair of tabs 1691, 1692 is attached to a gusset member 64 of the hoop portion 65. In other examples (not shown), the tabs are joined to the main section of the hoop portion 65 and not to the gusset member 64. The circumferential disposition of the sensor targets 168 on the arc of the hoop-member 65 or on the gusset member 64 can be based, at least in part, on the location of the sensor 167 and/or the sensitivity of the sensor 167. The circumferential disposition of the sensor targets 168 in the drawings is meant to be illustrative and not to point out a particular location.

An example of a suitable location for a sensor 167 is shown schematically in the detail drawing of FIG. 6B. The exemplary location shown is at the center of the support pylon 120 and is approximately at the height of one of the tabs 169 when it pivots past the pylon 120. In other examples (not shown), the sensor 167 can be located elsewhere on the pylon 120, including higher or lower, or off to one side.

Referring now to FIG. 7, a method is disclosed for operating a solar energy system 100 as disclosed in the foregoing embodiments and illustrated in FIGS. 6A and 6B. As illustrated by the flow chart in FIG. 7, the method comprises at least the 3 method steps S21, S22 and S23:

Step S21 includes rotating the pivot-wheel assembly towards a limit of the defined mechanical pivot range 900.

Step S22 includes receiving, by the drive-system controller 47, the signal from the sensor 167 indicating detection of a proximate presence of one of the spaced-apart sensor targets 168.

Step S23 includes stopping or slowing the rotating of the pivot-wheel assembly before reaching the limit of the defined mechanical pivot range 900. Step S23 is carried out in response to receiving the signal in Step S22. In some embodiments, the stopping and/or slowing is performed following a predetermined time interval after the receiving of the signal; the predetermined time is based upon at least one of: a current rotational or angular speed of the hoop portion 65, and a circumferential distance between the one of the spaced-apart sensor targets 168 and the limit of the defined mechanical pivot range 900. In some embodiments, the electric motor 42 comprises a stepper motor, and the rotating is stopped or slowed after a predetermined number of motor steps following the receiving of the signal; the predetermined number is based upon at least one of: a rotational or angular speed of the hoop portion 65 and a circumferential distance between the one of the spaced-apart sensor targets 168 and the limit of the defined mechanical pivot range 900.

In embodiments, a drive-protection arrangement as has been disclosed can be used, additionally or alternatively, for purposes of calibration of the drive system, and specifically for calibration of the angular orientation of the PV assembly. Referring now to FIG. 8, method is disclosed for operating a solar energy system 100 as disclosed in the foregoing embodiments and illustrated in FIGS. 6A and 6B. As illustrated by the flow chart in FIG. 8, the method comprises at least the 3 method steps S31, S32 and S33. As can be understood from the following description, Steps S31 and S32 are the same as Steps S21 and S22, respectively.

Step S31 includes rotating the pivot-wheel assembly towards a limit of the defined mechanical pivot range 900.

Step S32 includes receiving, by the drive-system controller 47, the signal from the sensor 167 indicating detection of a proximate presence of one of the spaced-apart sensor targets 168.

Step S33 includes calibrating an angular orientation of the PV assembly 57. Step S33 is carried out in response to receiving the signal in Step S32. In some embodiments, the calibrating is based on at least one of a detected intensity of the proximate presence of the spaced-out sensor targets 168 and a detected direction of the proximate presence of the spaced-out sensor targets 168.

Any of the methods and method steps disclosed herein can be combined in a single embodiment according to the scope of the present invention.

Terms such as 'joined', 'coupled', 'attached', 'mounted' and the like, when used herein, include both indirect and direct joining, coupling, attaching, mounting, etc., unless otherwise specified. It will be appreciated that the above descriptions are intended only to serve as examples, and that many other embodiments are possible within the scope of the present invention and as defined in the appended claims.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons skilled in the art to which the invention pertains.

The invention claimed is:

1. A method of operating a solar energy system, the solar energy system comprising a photovoltaic (PV) assembly defining a mechanical pivot range, a drive system comprising a pivot-wheel assembly and a drive-system protection arrangement, the method comprising:

rotating the pivot wheel assembly towards a limit of the defined mechanical pivot range of the PV assembly, wherein (i) the PV assembly comprises a frame subassembly and an array of PV panels joined thereto and pivotable therewith about a longitudinal axis of the PV assembly, (ii) the drive system further comprises a motor assembly including an electric motor and a drive-system controller, (iii) the pivot-wheel assembly of the drive system is arranged to transfer a torque from the electric motor to the frame subassembly, (iv) the pivot-wheel assembly comprises a drive chain joined to a hoop portion at two opposing coupling points defining respective limits of the mechanical pivot range of the PV assembly; and (v) a drive-system protection arrangement comprises:

A. a pair of spaced-apart tab portions comprising respective sensor targets, joined to the hoop portion and circumferentially displaced from the two opposing coupling points, and B. a sensor in electronic communication with the drive-system controller and operative to send a signal thereto indicating detection of a proximate presence of one of the sensor targets;

receiving, by the drive-system controller and from the sensor, the signal indicating the detection of the proximate presence of one of the respective sensor targets of the pair of spaced-apart tab portions; and responsively to receiving the signal, calibrating an angular orientation of the PV assembly.

2. The method of claim 1, wherein the respective sensor targets comprise magnets, and the sensor comprises a magnetic sensor.

3. The method of claim 1, wherein the respective sensor targets comprise a metal or metal alloy, and the sensor comprises an induction sensor.

4. The method of claim 1, wherein the sensor comprises an ultrasonic sensor.

5. The method of claim 1, wherein the sensor comprises an optical sensor.

6. The method of claim 5, wherein the respective sensor targets comprise markings or reflectors.

7. The method of claim 1, wherein the drive-system protection arrangement is configured so that the signal is sent before the pivot wheel is rotated to a limit of the mechanical pivot range.

8. The method of claim 1, wherein the drive-system controller is programmed to receive the signal and perform at least one of the following in response thereto:

i. stopping the rotating of the pivot wheel before reaching the limit of the defined mechanical pivot range, and ii. slowing the rotating of the pivot wheel before reaching the limit of the defined mechanical pivot range.

9. The method of claim 1, wherein in response to receiving the signal, one of the following is performed:

i. stopping the rotating of the pivot wheel before reaching the limit of the defined mechanical pivot range, and ii. slowing the rotating of the pivot wheel before reaching the limit of the defined mechanical pivot range.

10. The method of claim 9, wherein the stopping and/or slowing is performed following a predetermined time interval after the receiving of the signal, the predetermined time being based upon at least one of: a current rotational or angular speed of the hoop portion, and a circumferential distance between the one of the spaced-apart sensor targets and the limit of the defined mechanical pivot range.

11. The method of claim 9, wherein the electric motor comprises a stepper motor, and the rotating is stopped or slowed after a predetermined number of motor steps following the receiving of the signal, the predetermined number being based upon at least one of: a rotational or angular speed of the hoop portion and a circumferential distance between the one of the spaced-apart sensor targets and the limit of the defined mechanical pivot range.

* * * * *